United States Patent [19]

Redmann

[11] 4,442,794
[45] Apr. 17, 1984

[54] APPARATUS FOR CATCHING CATTLE

[76] Inventor: Frank W. Redmann, Rte. 2, 1061 Hwy. 97 South, Athens, Wis. 54411

[21] Appl. No.: 379,666

[22] Filed: May 19, 1982

[51] Int. Cl.³ .......................... A01K 1/06; A01K 1/08
[52] U.S. Cl. .................................... 119/115; 119/118
[58] Field of Search ............... 119/110, 111, 112, 114, 119/115, 116, 118, 119, 148

[56] References Cited

U.S. PATENT DOCUMENTS

| | | | |
|---|---|---|---|
| 2,779,312 | 1/1957 | Girton | 119/147 R |
| 2,815,735 | 12/1957 | Collier | 119/147 R |
| 3,123,051 | 3/1964 | Berg | 119/119 |
| 3,568,644 | 3/1971 | Schultes | 119/147 R |
| 4,055,149 | 10/1977 | Haiges | 119/147 A |

FOREIGN PATENT DOCUMENTS

| | | | |
|---|---|---|---|
| 1115077 | 10/1961 | Fed. Rep. of Germany | 119/148 |
| 643133 | 1/1979 | U.S.S.R. | 119/118 |
| 652934 | 3/1979 | U.S.S.R. | 119/110 |
| 703072 | 12/1979 | U.S.S.R. | 119/118 |
| 810169 | 3/1981 | U.S.S.R. | 119/118 |

Primary Examiner—Robert P. Swiatek
Attorney, Agent, or Firm—Henderson & Sturm

[57] ABSTRACT

Apparatus for automatically tethering a cow in a tie stall of a type having a milking pad for providing a place for a cow to stand and having partitions for separating a feed bunk from a milking pad, an access opening for allowing the head and neck of a cow to pass through the milking pad to the feed bunk and preventing the rest of the cow from passing therethrough, whereby a cow can stand on the milking pad and eat feed in the feed bunk. A frame is operatively connected to the partition below the access opening. A collar extending around the neck of a cow has a tripping chain connected thereto for hanging below the collar. A catching mechanism is operatively attached to the frame for automatically connecting the tripping chain to the frame upon contact of the tripping chain with the catching mechanism, whereby when a cow having a collar and tripping chain connected thereto sticks its head through the access opening, it will be automatically tethered.

8 Claims, 10 Drawing Figures

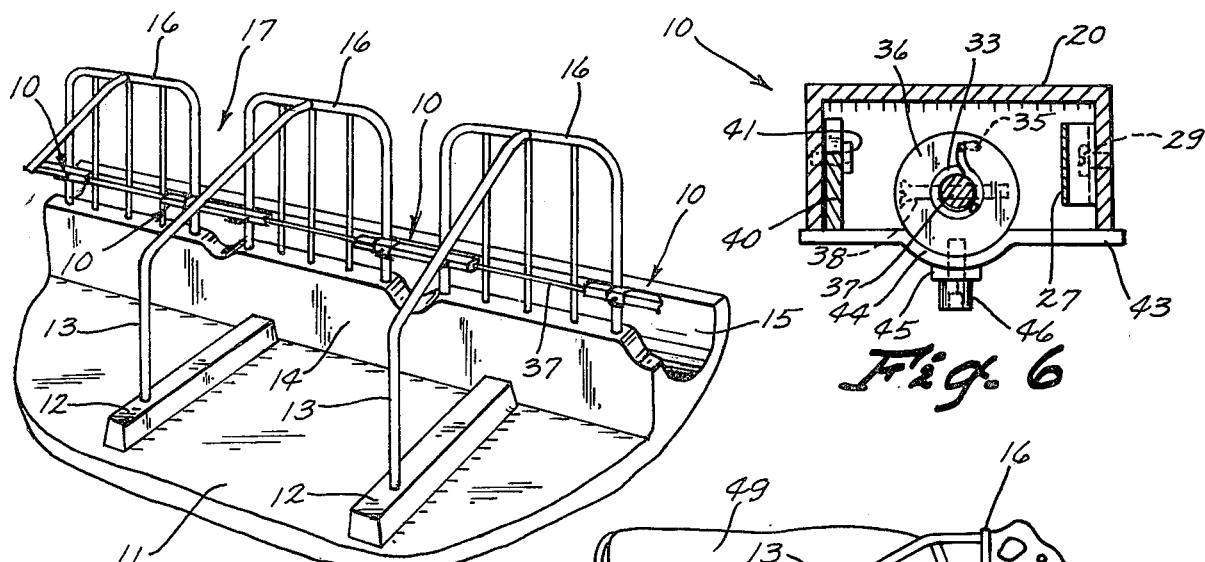
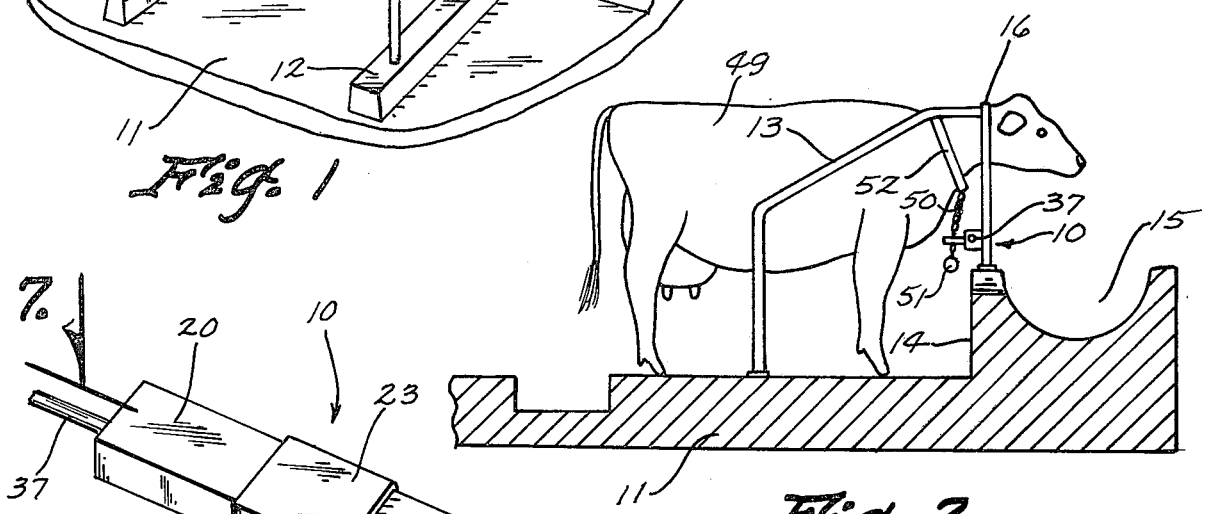
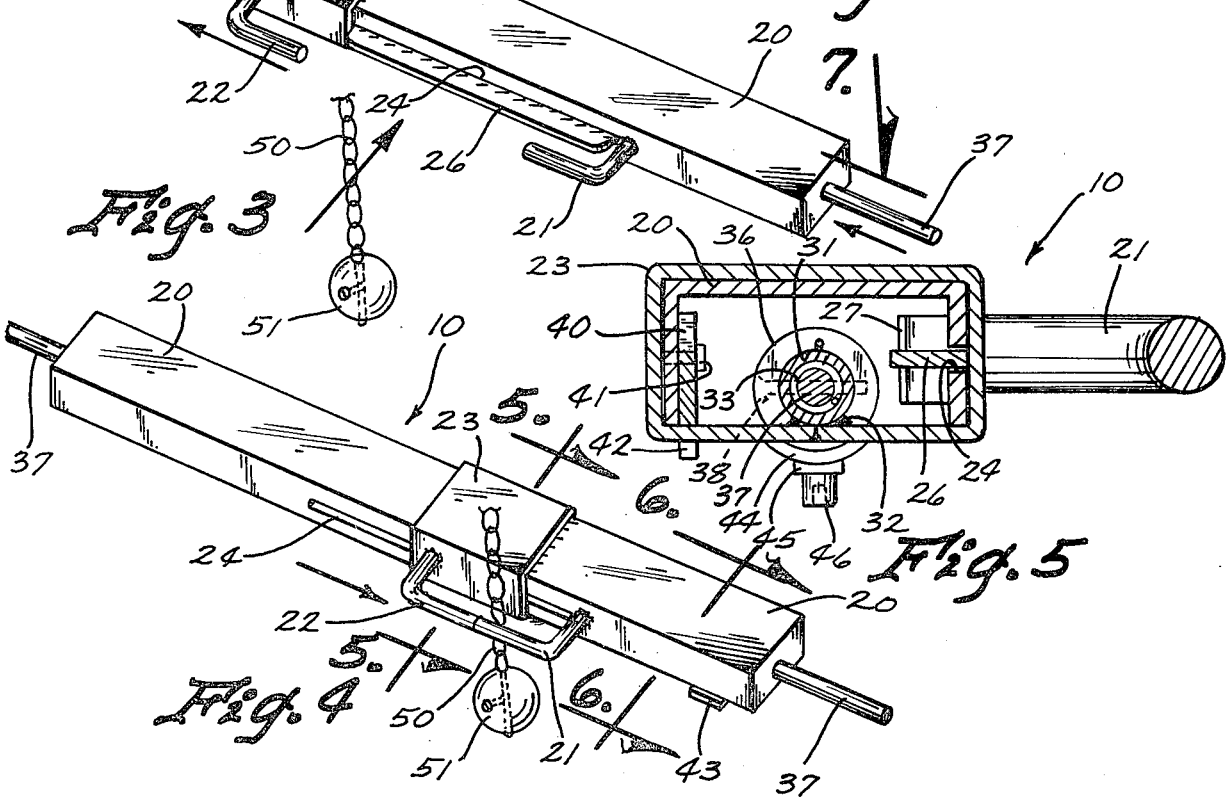

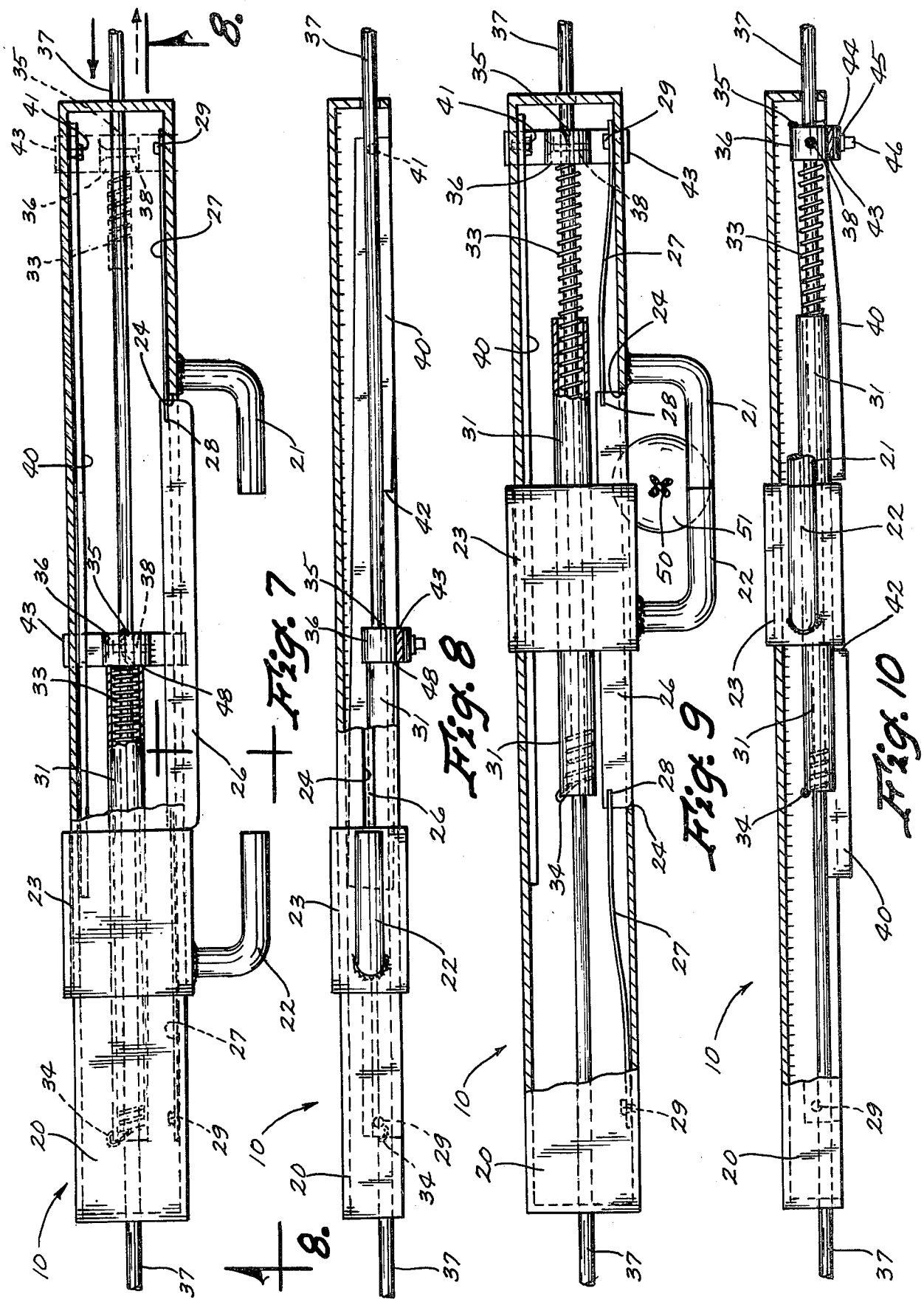

APPARATUS FOR CATCHING CATTLE

BACKGROUND OF THE INVENTION

The present invention relates generally to devices for restraining milk cows so that they can be milked, and more particularly to an apparatus for automatically confining milk cows and semi-automatically releasing such milk cows when desired.

The normal procedure in a dairy barn is to allow the milk cows to come into the barn at milking time, to restrain them, continue to restrain such cows while they are milked and fed, and then to release the milk cows until the next milking time. One common type of restraining device includes a collar attached around the neck of a milk cow. When the barn door is open, the milk cows will come into the barn and enter separate tie stalls which are comprised basically of a place for a cow to stand to be milked and having a partition means on the front thereof for separating it from a feed bunk, and having an access opening for allowing the head and neck of the cow to pass through from the milking pad to the feed bunk and preventing the rest of the cow from passing therethrough. When the cows come into these stalls, it is necessary for someone to take chains which are attached to the partition and attach these chains to the collar of each individual cow. It is not uncommon for the cows to resist this tethering attempt and consequently it can be very time comsuming, frustrating and disconcerting to both the cow and the person assigned this task. U.S. Pat. No. 2,779,312 to Girton and U.S. Pat. No. 3,123,051 to Berg show this general type of tie stall for cattle.

Another way to confine milk cows is shown generally in U.S. Pat. No. 2,815,735, which shows both the tie stall type of stanchion and the type of stanchion having a pivotable member which allows a cow to place its head therebetween; and once the head is in the feed bunk the member is pivoted over and locked against the neck, the cow cannot remove its head therefrom. The problem with the pivoting member stanchion device is very similar to the problems outlined above with respect to connecting a chain to a collar; that is, when a person tries to close the stanchion pivoting member, it is not uncommon that the animal will remove its head therefrom before such pivoting and locking is accomplished.

Consequently, there is a need to provide structures for saving time, effort and preventing undue disruption of the cattle restraining procedure.

SUMMARY OF THE INVENTION

The present invention relates to an apparatus for automatically tethering a cow in a tie stall of a type having a milking pad for providing a place for a cow to stand and having a partition for separating a feed bunk from a milking pad, an access opening for allowing the head and neck of a cow to pass through the milking pad to the feed bunk and preventing the rest of the cow from passing therethrough, whereby a cow can stand on the milking pad and eat feed in the feed bunk. A frame is operatively connected to the partition below the access opening. A collar extending around the neck of a cow has a tripping chain connected thereto for hanging below said collar. A catching mechanism is operatively attached to the frame for automatically connecting the tripping chain to the frame upon contact of the tripping chain with the catching mechanism, whereby when a cow having a collar and tripping chain connected thereto sticks its head through the access opening, it will be automatically tethered.

An object of the present invention is to provide an improved restraining apparatus for milk cows or the like.

Another object of the present invention is to provide an automatic tethering apparatus for milk cows.

A further object of the invention is to provide an automatic catching device for milk or other animals which is economical to produce and dependable to use.

Other objects, advantages and novel features of the present invention will become apparent from the following detailed description of the invention when considered in conjunction with the accompanying drawings.

BRIEF DESCRIPTION OF THE DRAWINGS

FIG. 1 shows a perspective view of a plurality of stalls having the present invention installed therein for automatically tethering milk cows or the like;

FIG. 2 is a cross-sectional view taken as a side view through the stall apparatus shown in FIG. 1;

FIG. 3 is a perspective view of the present invention in an open position, ready to be tripped;

FIG. 4 is a perspective view of the present invention as shown in FIG. 3, but showing the apparatus in a tripped position, wherein the animal is tethered;

FIG. 5 is a cross-sectional view taken along lines 5—5 of FIG. 4;

FIG. 6 is a cross-sectional view taken along lines 6—6 of FIG. 4;

FIG. 7 is a top elevational view of the present invention with a portion thereof broken away to show the inner workings thereof;

FIG. 8 is a front partial view and partial cross-sectional view taken along lines 8—8 of FIG. 7;

FIG. 9 is a top plan view of the present invention with portions thereof broken away and shown in the tripped position wherein the animal is restrained, as distinguished from FIG. 7 which shows the apparatus in a locked, opened and untripped position; and FIG. 10 is a front view of the apparatus as shown in FIG. 9, and having a portion of the frame cut away to show the interior thereof.

DESCRIPTION OF THE PREFERRED EMBODIMENT

Referring now to the drawings wherein like reference numerals designate identical or corresponding parts throughout the several views, FIG. 1 shows a plurality of the cattle catching and tethering devices 10 constructed in accordance with the present invention. FIG. 1 shows a milking pad 11 which consists of a concrete floor with upstanding side partitions members 12, constructed of concrete, and metal tubular members 13 forming partitions between the stalls. A concrete wall 14 forms part of a feed bunk 15 for feeding cattle or the like. Partition devices 16 are connected to the concrete wall 14 and are spaced so as to leave access spaces 17 so that a cow or other animal can stand on milking pad 11 and stick its head between adjacent panels 16 through the opening above each of the automatic tethering devices 10 to eat hay or other feed which is placed in feed bunk 15.

Referring now to FIGS. 3 and 4, it will be noted that the apparatus 10, which is connected to the partition panels 16 in FIGS. 1 and 2, includes a frame 20 having a first L-shaped member 21 rigidly attached on the front thereof such as by welding. A second L-shaped rod 22 is rigidly attached to a sleeve 23, also such as by welding, although other means of connection can obviously be used. Sleeve 23 which extends around the frame 20 is slideably disposed around the frame 20 and is movable from a first locked open position, as shown in FIG. 3, to a second closed position as shown in FIG. 4. A slot 24 as best shown in FIG. 4 is provided in the front of the frame 20, and this slot 24 allows a locking member 26 to pass out therethrough. The locking member 26 is biased to the position shown in FIGS. 3 and 7 by means of leaf springs 27 which are fit into a slot 28 on each end of the member 26 and such leaf springs being fastened at each end thereof to the housing 20 by means of fasteners 29.

Turning to FIG. 5, it is noted that the sleeve 23 has a tubular pipe member 31 rigidly attached thereto by a weld 32. A tension spring 33 is connected to one end of the tubular pipe member 31 as can readily be seen in FIG. 9. The other end of the spring 33 is rigidly attached at the other end 35 to a collar member 36 (FIG. 9). The collar 36 is, in turn, fixed to a reset rod 37 by the means of a set screw structure 38.

A second locking member 40 is pivotally attached to the frame 20 by means of a pivoting fastener member 41, as can readily be seen in FIGS. 5, 6, 7 and 9. This second locking member 40 has a shoulder 42 thereon as best seen in FIGS. 5 and 10 for the purpose of locking the second rod member 22 in the position shown in FIGS. 4 and 10 for reasons which will be explained below. A plate member 43 is bolted to the collar 36 as can be readily seen in FIGS. 9 and 10. A set screw 38, having an allen wrench opening in one end thereof, is threadably engaged through the collar 36 and against the rod 37 for holding the collar 36 fixed onto the rod 37, and the plate 43 is held in place over the top of the collar 36 and against and in slideable contact with the edges of the frame member 20 by means of a washer and nut arrangement 44 and 45 which is threaded onto the set screw 46. The purpose of securing the plate 43 to the collar 36 will be explained below as well.

In operation, after the milking procedure has been completed, the cow 49 would still be tethered, for example as shown in FIGS. 2 and 4 wherein a tripping chain 50 has a weighted metal ball 51 attached at the bottom thereof and the tripping chain 50 is attached to a collar 52 which is secured around the cow's neck. Consequently, it can be appreciated that when the L-shaped rods 21 and 22 are disposed around the chain 50, as shown in FIG. 4, the cow 49 is effectively tethered because the weighted ball 51 is too large to pass through the opening between the rods 21, 22 and the frame 20. When it is desired to release the cow 49, then the rod 37, which would initially be in the FIG. 9 position, is released by a securing mechanism (not shown) and then this rod 37 is moved from the position shown in FIG. 9 to the left (to the position shown in FIG. 7) wherein the abutment end 48 of the pipe 31 is contacted by a collar 36 on rod 37 and pushed to the left to the position shown in FIG. 7, bearing in mind that the pipe 31 is rigidly connected to the sleeve 23 and that the sleeve 23 is rigidly connected to the L-shaped member 22. As the rod 37 and the collar 36 are moved to the left from the position shown in FIG. 9 to the position shown in FIG. 7, the member 43 is also moved to the left with the collar 36, and this member 43 rides over and contacts the member 40, causing the member 40 (which is biased downwardly by gravity) to pivot upwardly from the position shown in FIG. 10 to the position shown in FIG. 8. This tends to unlock the sleeve 23 from the locked position shown in FIG. 10, because the shoulder member 42 is moved upwardly.

After sleeve member 23 has passed the left of the locking member 26, as shown in FIG. 7, the locking member 26 will move to the position shown in FIG. 7 because the leaf springs 27 bias member 26 to such position out through the opening 24. Once the locking member 26 extends outwardly through the opening 24, as shown in FIG. 7, then the rod 37 is moved back to the position shown in FIG. 9 and is secured to the barn or to one of the panels 16 at the end thereof. It will be appreciated that when the rod 37 is moved, it passes through each one of identical devices 10 and operates each one in an identical fashion, simultaneously. When the rod 37 is moved back to the position shown in FIG. 9, the sleeve 23 and L-shaped member 22 will remain locked open to the position shown in FIGS. 3 and 7.

Consequently, when it is time to prepare the cows for milking, feed will be placed into the feed bunk 15 as the milk cows are accustomed, and consequently when the barn door is opened again, the cows will file into the milking pad stalls in order to eat the food placed into the feed bunk 15. When the cows do this and put their head into the access opening 17 between the partition 16 to eat hay or feed from the feed bunk 15, the chain member 50 will contact the locking member 26 and push it inwardly into the housing 20, for example as shown in FIG. 5. When this occurs, the spring 33 will pull the pipe 31, sleeve 23, and L-shaped member 22 from the position shown in FIG. 3 to the position shown in FIGS. 4 and 9, thereby confining the chain 50 between the L-shaped members 21 and 22 and the housing 20. This has the effect, as explained above, of tethering each of the cows automatically. While it would sometimes be possible for the cow to pull the sleeve 23 and the L-shaped member 22 to the left, for example as shown in FIG. 9, this action is prevented because of the presence of the shoulder 42, which is part of the locking member 40 as was explained above.

Therefore, the cattle, such as cow 49, can be restrained with a minimumn of effort and commotion, thereby accomplishing all of the objects referred to above. When it is desired to release all of the cattle, then the procedure outlined above is again performed; that is, moving the rod 37 to the left to reset each of the devices and release each of the cows, and then the rod 37 is moved again to the right and secured with respect to frame 20 so that the cattle can be automatically caught again when they return to the barn for the next milking session.

Obviously, many modifications and variations of the present invention are possible in light of the above teachings. It is therefore to be understood that, within the scope of the appended claims, the invention may be practiced otherwise than as specifically described.

I claim:

1. Apparatus for automatically tethering a cow in a tie stall, said tie stall being of a type including a milking pad for providing a place for a cow to stand and having partition means for separating a feed bunk from a milking pad, and feed bunk access means for allowing the head and neck of a cow to pass through from the milking pad to the feed bunk and preventing the rest of the cow from passing therethrough, whereby a cow can stand on the milking pad and eat feed in the feed bunk, said tethering apparatus comprising:

a frame means for being operatively connected to said partition means below said access means;

collar means for extending around the neck of a cow;

tripping means connected to said collar for hanging below said collar means, said tripping means includes an enlarged member on one end thereof; and catching means operatively attached to said frame for automatically connecting the tripping means to said frame upon contact of said tripping means with said catching means, whereby when a cow having a collar means and tripping means connected thereto sticks its head through the access means, it will be automatically tethered in that position, said catching means comprises an L-shaped first rod rigidly connected to said frame means and extending toward said milking pad and having a free end;

a second L-shaped rod extending toward said milking pad and having a free end thereon;

mounting means for slideably attaching said second L-shaped rod to said frame means;

rod biasing means for biasing said second L-shaped rod to a first position wherein the free ends of said first and second L-shaped rods are substantially in abutment;

means for locking said second L-shaped rod in a second position spaced from said first position whereby the free ends of said first and second L-shaped rods are spaced a substantial distance apart;

lock biasing means connected to said frame means for biasing said locking means to its locking position;

said locking means being disposed between said first and second L-shaped rods in the locked position thereof when the second L-shaped rod is in the second position thereof, whereby contact of the tripping means with the locking means will unlock the locking means and automatically allow the rod biasing means to move the second L-shaped rod to the first position thereof thereby causing the first and second L-shaped rods to be disposed around the tripping means with the collar means disposed above the L-shaped rods and the enlarged member below the L-shaped rods, said enlarged member being of a size too large to pass through the space between the L-shaped rods and the frame when the second L-shaped rod is in the first position thereof; and resetting means for releasing a tethered cow and resetting said catching means for subsequent use.

2. The apparatus of claim 1 including a second locking means for locking said second L-shaped rod in the first position thereof to prevent a cow from overcoming the rod biasing means.

3. The apparatus of claim 2 wherein said resetting means includes means for unlocking said second locking means and locking the first said locking means.

4. The apparatus of claim 3 wherein said means for unlocking said second locking means and locking the first locking means comprises a reset rod means slideably disposed through said frame;

a collar rigidly attached to said means;

said rod biasing means being connected to said collar and to said mounting means for slideably attaching said second L-shaped rod to said frame means;

abutment means for providing abutment of said collar to said mounting means; and securing means for selectively said reset rod means to a first position or for allowing said reset rod means to be pushed to a second position whereby the collar is in abutment with the abutment means and the second rod can be moved to the position whereby the first said locking means can move to lock the second rod in the second locked position and whereby said reset rod means can be moved back to the first position thereof and secured in place with said securing means so that said tethering apparatus is reset for subsequent use.

5. The apparatus of claim 4 wherein said means for unlocking said second locking means includes means attached to said abutment means for unlocking said second locking means just prior to locking the first said locking means.

6. The apparatus of claim 5 wherein said second locking means comprises a lever pivotally attached to said frame and including lever biasing means for biasing the lever towards a portion of said mounting means, said lever having a shoulder thereon, said lever biasing means causing said shoulder to pivot into juxtaposition with said mounting means when said L-shaped member is in the first position thereof.

7. The apparatus of claim 4 wherein said frame means is substantially C-shaped in cross-section and said mounting means includes a sleeve extending slideably around said frame means, a tube being rigidly attached to said sleeve, one end of said tube having one end of the rod biasing means attached thereto and the other end of said rod biasing means being attached to said collar on said reset rod means said rod biasing means comprising a tension spring extending through said tube, the other end of said tube comprising said abutment means.

8. The apparatus of claim 4 including several of said tethering apparatuses and wherein said reset rod extends to each of said tethering apparatuses whereby each of said tethering apparatuses can be reset to the second position of said second L-shaped rod with a single reset rod.

* * * * *